United States Patent [19]

Miller et al.

[11] Patent Number: 4,858,464
[45] Date of Patent: Aug. 22, 1989

[54] PORTABLE PIPE TESTING APPARATUS

[76] Inventors: James J. Miller; Robert C. Valentine, both of 25334 Oakhurst Dr., Spring, Tex. 77386

[21] Appl. No.: 238,570

[22] Filed: Aug. 30, 1988

[51] Int. Cl.$^4$ .............................................. G01M 3/08
[52] U.S. Cl. ...................................................... 73/49.5
[58] Field of Search ....................... 73/49.1, 49.5, 49.6

[56] References Cited

U.S. PATENT DOCUMENTS

| | | | |
|---|---|---|---|
| 2,062,527 | 12/1936 | Postlewaite | 73/49.5 |
| 3,710,628 | 1/1973 | Horton | 73/49.5 |
| 4,127,026 | 11/1978 | Battafarano | 73/49.5 |
| 4,458,522 | 7/1984 | Toelke | 73/49.5 |
| 4,470,295 | 9/1984 | Pounds et al. | 73/49.5 |
| 4,571,986 | 2/1986 | Fujii et al. | 73/49.1 |

FOREIGN PATENT DOCUMENTS

| | | | |
|---|---|---|---|
| 2158735 | 6/1972 | Fed. Rep. of Germany | 73/49.1 |
| 539788 | 2/1956 | Italy | 73/49.5 |
| 807094 | 2/1981 | U.S.S.R. | 73/49.5 |
| 1332169 | 8/1987 | U.S.S.R. | 73/49.1 |

Primary Examiner—Stewart J. Levy
Assistant Examiner—Joseph W. Roskos
Attorney, Agent, or Firm—Gunn, Lee & Miller

[57] ABSTRACT

The present disclosure is directed to a portable elongate frame made of multiple lengthwise stringers which support the pipe testing apparatus. The frame has upper and lower stringers which are laced together by cross connected braces, and said stringers assemble into an elongate structure having first and second carriages at opposite ends thereof. The two carriages support first and second test heads for the pin and box of the joint. They are equipped with resilient members which squeeze against the pipe, contact the joint on the interior on the pin end, and on the exterior at the coupling at the box end. The structure is formed of multiple lengthwise stringers, the stringers at one side being hinged, and the stringers at the opposite side being released by a latch means to enable the structure to be folded into two equal portions for easy mounting behind a tow vehicle connected therewith by a V-shaped trailer hitch.

20 Claims, 2 Drawing Sheets

PORTABLE PIPE TESTING APPARATUS

BACKGROUND OF THE INVENTION

The present disclosure is directed to pipe testing apparatus and more particularly a system that is portable. It is the type of device which is intended to be hauled to a field location for the purpose of hydrostatic pressure testing of pipe. The term pipe as used herein refers to the tubular member without fittings on the end. The fittings are ordinarily called couplings. A joint is a pipe with an end located coupling. This apparatus is particularly useful for testing oilfield goods including tubing, drill pipe, and casing. The present apparatus, moreover, is directed to a portable test system which can be truck hauled by means of a tractor so that the present invention is constructed to accommodate a joint of pipe of standard length.

Ordinarily, a joint of pipe used in the oilfield is about 30 feet in length. That is, the hollow tube is manufactured to that length, and fittings or couplings are attached to the ends. Typically, the drill pipe length will be in the range of about 30-32 feet. Some casing is as long as 45 feet. Typically, a coupling is normally threaded to the pipe so that testing of the joint also involves testing of the threaded joint between the pipe and the coupling on the end. Some clearance must be obtained so that the joint can be engaged at both ends. One end will be described as the pin end and the other will be the box end, referring to whether the threads are on the exterior or interior. The box end is normally assembled by connecting a coupling on one end of the pipe to thereby present internal threads, hence forming a box end. Because there are variations from joint to joint in length and because joints having damaged threads can simply be trimmed and rethreaded, yielding a joint of perhaps 28 or 29 feet in length, the pipe testing apparatus must accommodate a length typically about 30 feet plus or minus about two feet. Some casing is up to 45 feet in length. This length, therefore, prescribes the approximate length of equipment necessary for testing purposes and taking into account end located equipment, the portable pipe testing apparatus is in the range of about 40 or even 45 feet in length. Assuming a 45 foot long structure, and further assuming a suitable trailer hitch or tongue mechanism for connection with a tractor, one approaches approximately 60 feet in length for a tractor pulled structure of this length. The present apparatus is, however, a portable pipe testing system which is folded in the middle to thereby shorten the length of the structure and to make it more readily portable without approaching 60 foot in length. Rather, the folded trailer is in the area of about 24 to 26 feet in length and can be attached to mid sized tractors in view of the fact that it is not exceedingly heavy and thus defined a truly portable pipe testing apparatus. Indeed, the length (when folded) is only about 35 feet for a system sufficiently long enough to test casing as long as 45 feet.

Attempts have been made heretofore to provide pipe testing systems. One such device is U.S. Pat. No. 4,067,228 showing a type of heavy rail system where a pipe is supported on wheeled carriers. It includes something similar to a spindle found in a metal lathe to rotate the pipe. A more recent patent is U.S. Pat. No. 4,571,986 which is directed to a pneumatic pipe leak tester apparatus. U.S. Pat. No. 4,470,295 is a structure which is mounted on a goose neck trailer showing various aspects of the pipe handling system. Recent U.S. Pat. No. 4,458,522 shows a set of parallel frame members which support spaced end located structures for testing a pipe, the end located structures being mounted on the frame members extending the length of the system. It uses threaded tension rods on both sides to maintain a tension-compression balance between the support structure and the pipe. A type of pipe gripping mechanism useful in such pipe systems for hydrostatic testing is described by U.S. Pat. No. 4,127,026. U.S. Pat. No. 3,710,628 is a trailer mounted pipe testing apparatus further disclosing an elongate main frame. The pipe testing apparatus of the present disclosure sets forth a type of portable folding trailer having a set of elongate lengthwise stringers and further including means for accommodating variations in pipe length so that hydrostatic testing can occur.

One feature of the present testing apparatus is the ability of the system to test a threaded joint. That is, it is able to engage the pin end without galling the threads on engagement. Rather, the joint ends are engaged by a surrounding resilient member confined within a sleeve which is positioned internally the end, and which is operated to swell against the joint, thereby forming a leakproof connection. This leakproof connection assists in sealing without actually using the threads. That is, the joint end is engaged by the resilient member but it is not threaded to the threads in the fashion of a threaded meet.

The type connection is also made at the opposite end which is the box end. There, the pipe terminates in a coupling which has a large surrounding exterior wall and engagement to the box end is accomplished by a surrounding resilient ring. On applying the proper squeeze to the resilient material, a leakproof connection is achieved.

The present test apparatus contemplates positive engagement with both ends simultaneously. While resilient members are applied, the joint is not loaded with an axial compressive loading. Rather, it is gripped at both ends but no loading is applied and hence, no distortion occurs. That is, the loading procedure holds the joint in position, engages both ends of the joint, but the position which is held does not involve excessive axial loading. In other words, axial loading is substantially reduced, and the joint is held in location for the test subject to only modest axial loading.

The present apparatus is constructed so that it will hinge in the middle to permit its removal to another location. The joint after testing can be kicked away and further processed. The test equipment, after its use, can thereafter be moved to another location by simply folding the lengthwise framework which is constructed with a pivot hinge, and structural integrity is thereby obtained in or throughout the structure of interest.

Structural integrity involves support of joint during testing. The joint is routinely filled with water and pressure applied to the water and half for an interval. It is not uncommon to apply pressures as high as 10,000 psi or greater. When pressures of this amplitude are applied, the loading along the length of the support structure for testing the joint is quite large. As an example, a joint have a nominal ID of 7.5 inches hydrostatically tested to 10,000 psi requires a reaction force of over 440,000 pounds to hold a test plug internally in the joint against the hydrostatic pressure maintained in the joint.

This very substantial loading has to be carried by lengthwise stringers used in forming the apparatus.

The stringers which comprise the elongate trailer of this disclosure are deployed typically in a rectangular framework, there being two above and two below the joint. This defines left and right open sides so that the joint can be delivered into the test apparatus and removed after testing. The left and right slots typically enable adjacent joint racks to be positioned for transfer of the joint onto and away from the structure. Thus, one adjacent joint rack is the inbound rack and the other adjacent joint rack receives the tested joint.

This arrangement utilizing a surrounding framework adjacent to the joint during tests in conjunction with adjacent left and right joint racks provides a safety mechanism. It is possible, through no fault of the present apparatus, that a particular joint will catastrophically fail, thereby rupture, and perhaps explode, throwing large pieces of metal. The metal can not be thrown downwardly because it is blocked. Also, it can nqt be thrown upwardly because the stringers defining the length of the structure pass overhead and are connected with a suitable lattice work for structural reinforcing. As a consequence, safety is enhanced by reducing the window through which the joint might throw fragments during or as a result of a catastrophic metal failure. This confinement of the joint is beneficial in reducing the risk to operating personnel. Just as importantly, the joint is confined against lengthwise expansion, is held in resilient plugging mechanisms, and is therefore constrained by end located wheeled carriages supported on the stringers. The carriages are equipped with spindle type mechanisms which extend and thereby support the end located gripping mechanisms for alignment with the joint. Moreover, they move into and out of engagement with the joint without placing axial loading on the joint. The joint inevitably must be stressed when it is hydrostatically pressure tested. It is desirable to stress the joint and particularly the response of the joint to hydrostatic pressure without adding axial loads to the joint. This is accomplished by aligning and then moving end located carriages with the joint.

In summary, the present apparatus comprises an elongate framework assembled from parallel stringers, having carriage wheels under one end and having a jack under the opposite end to enable the stringer defined structure to be properly leveled. When it is installed, it is preferably tilted so that bubbles in the water filling the joint run to one end. The stringers are constructed with a hinge in the middle so that the long structure is folded in half and is more easily hauled on the highway. Another important feature relating to this is the incorporation of a trailer hitch whereby the structure, after folding, is then able to be hauled by trailer. A bogy is inserted under the folded structure, thereby serving as a set of front wheels for the towed trailer. The trailer weight can be carried on the hitch and the bogy omitted if desired.

With the foregoing background in mind, the present apparatus is summarized as a system which engages a joint with coupling, wherein the engagement prevents leakage while testing is undertaken. The testing process involves making a seal against the pipe end with a concentric rubber donut appropriately squeezed to provide sealing. Positioning of the rubber donut is assured by a concentric metal sleeve moreover, hydraulically actuated cylinders squeeze the donut to thereby swell the donut, the distortion in the resilient member assuring the seal. The device engages the joint at both ends and then releases, thereafter permitting testing of another joint.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the drawings:

FIG. 1 is a side view showing the apparatus of the present invention testing a joint which is located between a pair of end located carriages and is sealed to permit filling with water for hydrostatic pressure testing;

FIG. 2 is a sectional view taken along the line 2—2 of FIG. 1 showing the position of the joint relative to the surrounding framework and stringers;

FIG. 3 is a plan view of the apparatus shown in FIG. 1 which has been folded at the center to define two halves making a shorter framework permitting towing on the highway;

FIG. 4 is a detail view of the hinge involved in the folded framework shown in FIG. 3.;

FIG. 5 is a sectional view through means for engaging the pin end of the joint to perfect a seal for pressure testing; and FIG. 6 is a sectional view similar to FIG. 5 showing details of the construction for the means sealing the box end of the joint for hydrostatic testing.

DETAILED DESCRIPTION OF THE PREFERRED EMBODIMENT

Figure 1:
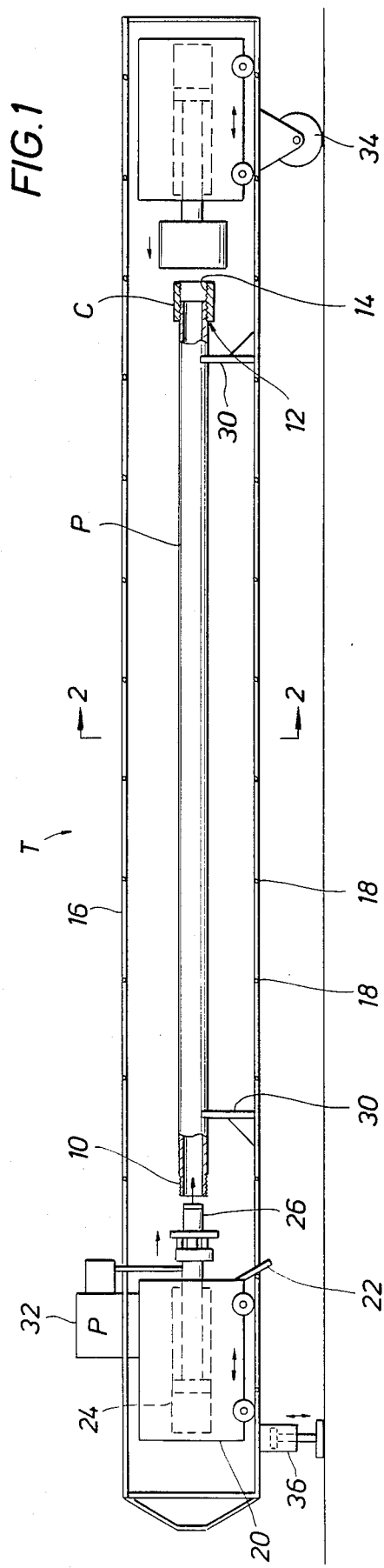

Attention is first directed to FIG. 1 of the drawings which shows a joint P undergoing hydrostatic testing. The joint is a conventional a tubular member which is formed with threads at both ends on the exterior. A coupling C is attached at one end. The coupling defines the box end of the joint while the opposite end is labeled the pin end of the joint. The pin end is identified at 10 while the coupling C threads to the external threads 12 on the joint to locate a set of threads 14 on the interior so that the tubular joint shown in FIG. 1 can thereafter be threaded into a string of tubular joints in making up a tubing string, drill string or casing string typically used in oil well drilling and production. It is necessary to test the joint and coupling to a specified pressure level to assure that quality tubular goods are being used in the well. The goal is therefore to test the joint and coupling, and the test involves plugging both ends of the joint in a manner to be described, filling the joint with water, pressuring the water to a specified minimum level, and holding the pressure level for a specified time to assure that leakage does not occur. The joint may fail in many modes including the rare possibility of dangerous metal rupture as a result of testing. The apparatus is therefore intended to safely test a joint and determine whether or not it can be used in a string of joint.

Figure 2:
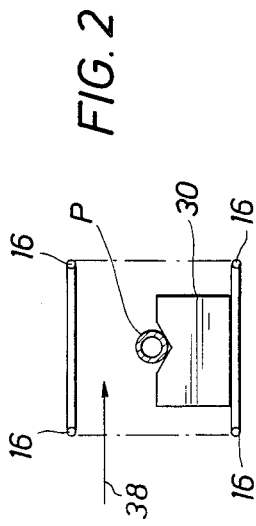

The test structure is identified generally by the symbol T which refers to the structure shown in FIG. 1 for hydrostatic testing. It is formed of a set of parallel horizontal stringers 16. They are load bearing members which extend approximately 50 feet in length. The joint is normally about 30 feet in length plus or minus two feet. The coupling adds a few inches so that the entire structure can be described as a 30 foot joint, realizing that this is an approximation for drill pipe. The stringers thus extend the length of the joint and further, thereby support the equipment to be described, and confine the joint therewithin. Tubing and casing may have different lengths; the test system T preferably accommodates tubular goods having lengths up to some maximum which is a scale factor for the system T. Representative dimensions given enable testing of many common sizes. There are ideally four stringers arranged at the corners of a rectangle as shown in FIG. 2 and they are connected together by horizontal frame members 18. The stringers 16 extend approximately 50 feet in length and terminate at appropriate framing members. This provides a kind of elongate, box like structure. It is constructed so that it can hold the joint and resist the forces created during testing. Substantial loading will occur during testing, and to this end, the framework must be relatively strong. The test system T is provided with the strength inherent in this type construction.

The numeral 20 identifies a pin carriage which cooperates with a similar box carriage at the opposite end. They are spaced from one another to capture the joint therebetween. The carriage 20 can move back and forth on appropriate guide rollers engaging horizontal tracks between the stringers 16. It is movable back and forth so that spacing can be adjusted as indicated by the arrows in FIG. 1, and it is locked in a particularly location by means of a latch which engages the framework. The latch 22 secures the carriage at a particular location. The carriage extends test equipment towards the joint. The carriage incorporates a piston and cylinder 24 which extends the test equipment 26. This equipment will be described as the test head 26. The test head 26 is better shown in FIG. 5 and will be described in detail.

The joint is supported on two or more supports having an upwardly facing V-shaped notch. The supports 30 are spaced from one another to support the joint joint. As shown in FIG. 2 of the drawings, the joint is supported on the supports 30 and is aligned for testing as will be described. A pump 32 delivers water under pressure through a line into the test head 26. If desired, the pump can be located off to the side and a flexible line can be used to connect with the test head 26. In any case, the pump delivers water under pressure to selectively fill the joint and conduct the test.

The structure shown in FIG. 1 is installed for operation at its full length. That is, it is a folded structure which is divided into two portions. One end of the structure is supported by suitable wheels 34. This permits towing on the highway. Moreover, the opposite end is supported under a jack 36 which can be raised or lowered to position the test equipment T at an elevated angle. A proper angle involves elevation of one end of the pipe by a few degrees so that air bubbles trapped in the pipe will flow to one end or the other and are removed in this manner. The test is ideally performed with a joint filled with water and no air bubbles.

In FIG. 2 of the drawings, the arrow 38 shows the manner in which the joint is introduced axially into the framework between the several stringers 16 and held on the supports 30. Typically, it is initially stored on inbound pipe racks on one side of the test device T, and after testing, the pipe joint is then removed to the other side of the equipment and is supported on another set of joint racks. This permits affiliated personnel to deliver joint for testing and to remove the tested joint.

Figure 3:
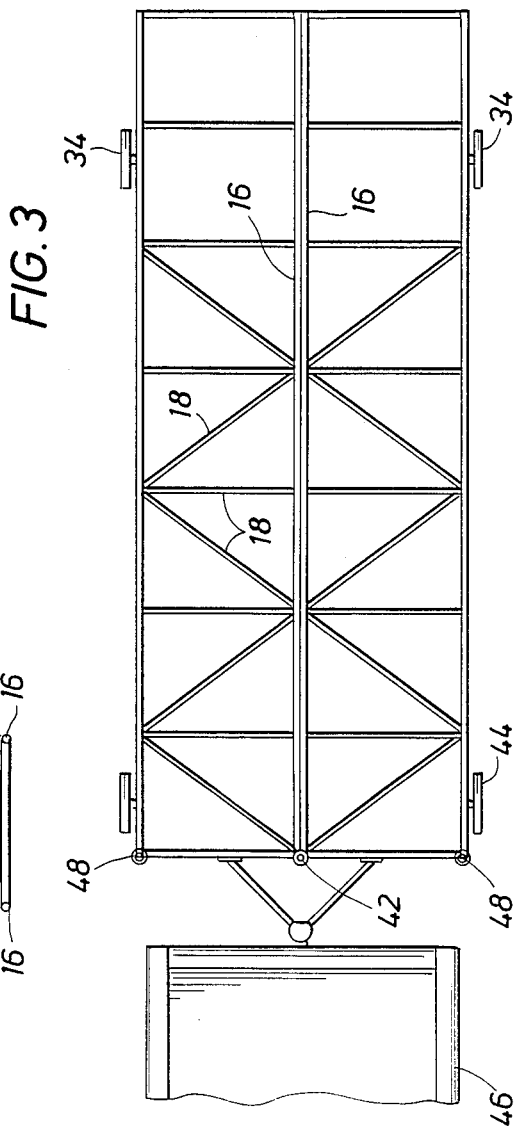

Attention is now directed to FIG. 3 of the drawings. There, the framework is shown folded into two halves which are equal in length. This requires the use of mounting brackets and the wheels 34 so that they can be demounted and remounted as shown in the contrast of FIGS. 1 and 3. The two wheels support the assembled framework shown in FIG. 1. In FIG. 3, they are attached to the folded portions, but after folding, they are in the spaced position to provide trailer support for highway travel. The framework folds or hinges at 42. This is a hinge which involves the stringers on that particular side. They hinge at 42 and permit the two halves to fold into the parallel arrangement shown in FIG. 3. This requires the remaining two stringers to disconnect at 48. A hinge pin 50 is fastened in each stringer so that the split stringer becomes a single unitary structure.

The equipment after folding into the form shown in FIG. 3 is connected by means of a V-shaped tow bar to a tractor 46 for towing. This arrangement in FIG. 3 shows how the apparatus is readily towed on the highway, resting on the bogy 44 which is temporarily placed under the front end of the trailer shown in FIG. 3. Since the structure has been folded in half, the length is only half that shown in FIG. 1. Since the length is initially 50 feet it is then 25 feet on folding, being only slightly increased by the V-shaped trailer hitch shown in FIG. 3. Accordingly, the present apparatus contemplates the use of a framework longer than the joint and sufficiently long to support the pair of test heads at the two ends and their mounting carriages and wherein the folded condition assures proper towing. Since it is an open lattice type structure, the weight is relatively reasonable and heavier tow equipment is not required. This avoids the use of a fifth wheel, connective hoses for pneumatic brakes and other equipment normally associated with highway trailers.

Figure 5:
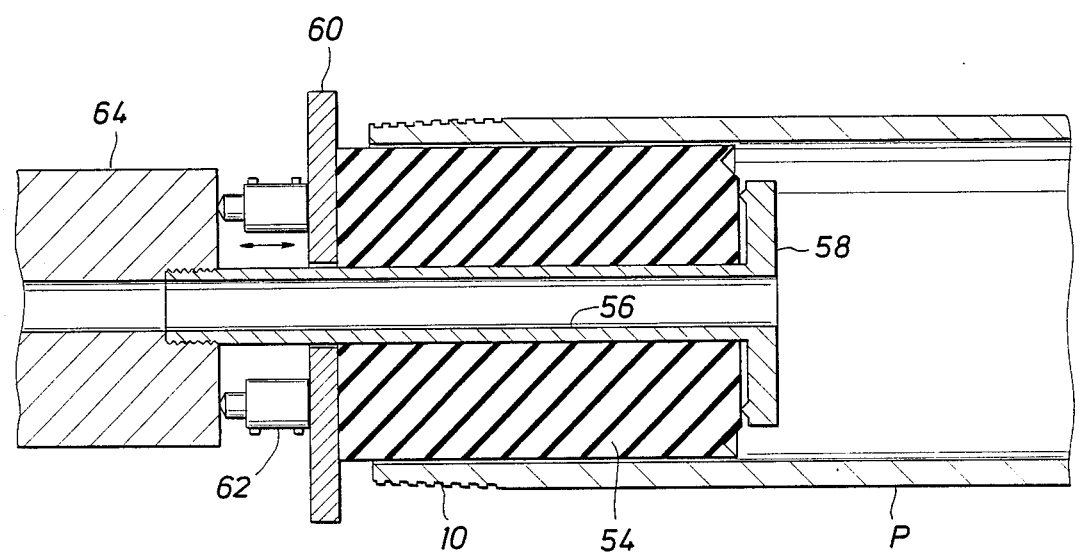

In FIG. 5 of the drawings, the pin end of the joint is shown. Recall that it has threads on the exterior. The test head 26 engages the joint P for pressure testing without engaging the threads. It is desirable to accomplish this for many purposes. Moreover, it avoids loading the joint at the threads, running the risk of thread failure during testing. The threads can be inspected by other testing procedures which do not involve such a risk. In any event, the test head 26 is extended into the joint. This positions a resilient plug 54 within the joint. In the uncompressed state, the plug 54 fits snugly in the joint, leaving a narrow gap. Typically, the gap will be at the high side because the plug will not be perfectly concentric in the joint. Locating the gap at the high side permits air bubbles to escape, and when water flows out around the gap as shown in FIG. 5, then the resilient plug can be expanded as described. the air bubbles can be voided (along with some water) at the raised end through the gap prior to plug closure or through the water line prior to pressurization of the tubular member. The resilient plug 54 is mounted on a hollow mandrel 56. The mandrel terminates at a surrounding collar 58 which locks the plug 54 in place. The plug is somewhat loose around the mandrel 56 to permit it to be compressed by an end located compression plate 60. The plate 60 is loosely fitted around the mandrel 56. Multiple hydraulic cylinders 62 are extended together. The cylinders 62 compress the plate 60 against the plug, and causing swelling, thereby perfecting a seal on the inside of the joint. The mandrel 56 joins to a support stem 64 for the test head 26. They are both hollow so that a passage is provided through the mandrel 56 to introduce water under pressure from the pump 32 shown in FIG. 1. This water is delivered in high volume when the equipment is first switched on, and fills the joint. The joint is tilted so that air bubbles escape through the gap adjacent to the plug 54 which permits total filling without air. Swelling and expansion of the plug 54 then seals the air gap, prevents the escape of water after the air is expelled and enables testing. Hydrostatic pressures in excess of 10,000 psi can be held by this construction.

It will be noted that the joint threaded area is touched only by resilient material. It is not axially loaded by the carriages. In other words, it is not loaded as a column. There may be loading in the wall of the joint, but this results solely from inflation with fluid under pressure. In summary, the apparatus shown in FIG. 5 swells to expand, fully plugging the joint after insertion to accomplish the seal. When the resilient plug 54 shrinks, disengagement is easily accomplished as the test head 26 is retracted. Moreover, the test head incorporates the hydraulically powered compression plate 60 which is forced against the plug, but the plug drives the plate back to the relaxed condition when hydraulic power is removed. In summary, the system engages the end of the joint and assists in sealing, enabling hydrostatic testing, all without axially loading the joint and without engaging the joint at the threads 10.

Figure 6:
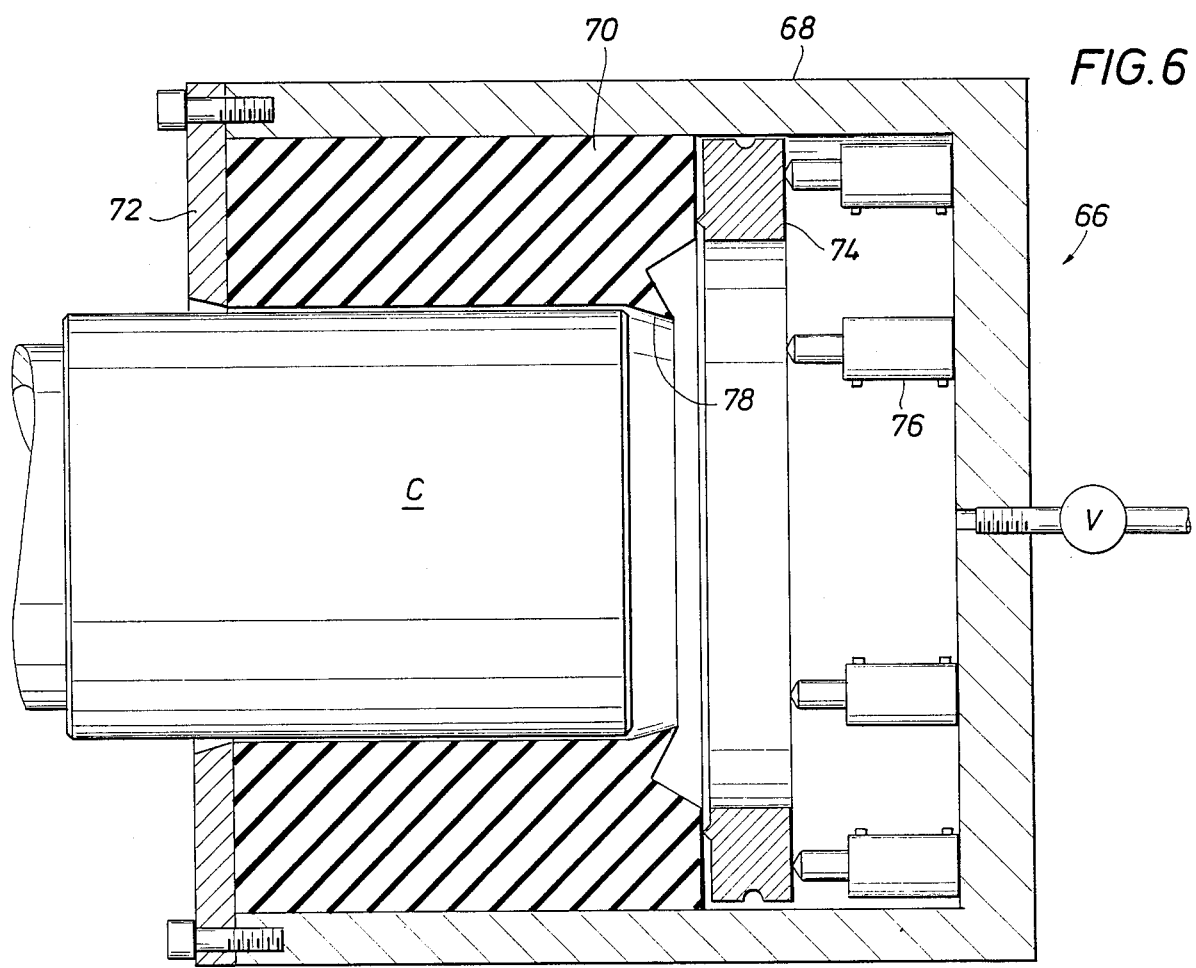

Attention is now directed to FIG. 6 of the drawings where the opposite test head 66 is identified. This test head is constructed to engage the coupling C. Recall that the coupling is threaded on the interior. The test head 66 includes a canister 68 which is hollow and which supports a resilient plug 70 therein. The plug 70 is captured as illustrated. A plate 72 is bolted to the canister 68 to clamp the plug in location. The plug is abutted by an expansion ring 74 at the inward end. The ring 74 is axially forced against the resilient plug 70 by hydraulic pressure delivered to the set of similar hydraulic cylinders 76. They drive the ring 74 against the resilient plug, causing swelling and expansion, thereby forming a seal with the coupling. The plug 70 in its relaxed condition is sized and shaped so that it fits loosely around the coupling C. This permits easy engagement into the coupling. After insertion, the hydraulic cylinders 76 are actuated, moving the ring 74 and compressing the plug. When compressed, it swells radially inwardly. This contrast with the resilient plug 54 which swells radially outwardly to engage the joint. Here, the plug is confined so that it must swell radially inwardly to accomplish engagement. Sealing is accomplished on a broad area around the coupling. As before, no axial load is applied as a result of operation of this structure, and the threads of the coupling are not engaged. As desired, a fluid inlet line is shown in FIG. 6 to deliver water under pressure. The operator may choose to fill the joint joint from either end, or from both ends. Obviously, air is forced out by water until all the air is exhausted and water fills the pipe.

The test head shown in FIG. 6 is operated by first inserting the coupling into the resilient plug 70. Ideally, the resilient plug includes an inwardly protruding lip 78 which limits the distance that the coupling is inserted. The lip 78 is used as a registration means, and is not critical to the seal which is thereafter perfected. After the coupling has been inserted, hydraulic pressure is applied whereby the resilient plug 70 is radially expanded inwardly thereby perfecting the seal around the coupling. At this juncture, water can be introduced into the coupling. It can be introduced into either end as mentioned before. When the water is introduced, the joint is filled, forcing air evacuation as described and the test is performed. Thereafter, hydraulic pressure is relieved, and the resilient plug forces the ring 74 back to the right as viewed in FIG. 6 and the plug shrinks, permitting disengagement.

Operation of this equipment will be described beginning with the equipment folded as shown in FIG. 3 of the drawings. Assume that it is folded and rigged for highway transport. In this instance, it travels on a pair of trailer wheels at the rear. The stringers are hinged and folded as illustrated. For safety sake, the two hinged portions are preferably tied together by some suitable means not shown for sake of clarity. At the forward end, the V-shaped trailer hitch is attached so that the equipment can be towed by conventionally equipped tow vehicles. A fifth wheel is not needed, and the ordinary approach is to tow the equipment utilizing conventional pivotal tow bar connectors. The bogy 44 is inserted under the front end for sake of support. Alternatively, the trailer weight may rest on the hitch for towing and steering so that the rear wheels simply follow in the conventional fashion. The leveling jack shown in FIG. 1 is carried separately so that it can be installed at the time of testing in the field.

Figure 4:
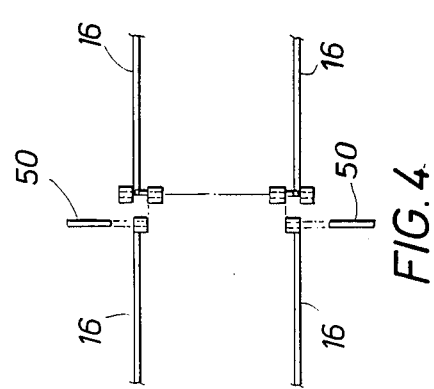

The trailer travels down the highway to a suitable location. At the work location, the tow bar is detached and removed. By means of a crane or other hoist, the two halves of the frame are unfolded and straightened. The frame weight is not excessive; it is not so difficult to straighten out, and indeed, can be accomplished by supporting the center portion and the two folded ends on well known removable gimbaled wheel structures. Once straightened, the pins are installed as exemplified in FIG. 4 to provide the 50 foot long structure. The hydraulic jack 36 is inserted under one end while the opposite end is supported on wheels, and the proper tilt is applied to the system so that air bubbles are directed to one end. The joint is delivered from an adjacent joint rack through the test equipment and onto the outbound or tested joint rack. The joint is tested in a sequence specified by the user. An example is to test the joint by pressuring up to a level in excess of 10,000 psi and holding this pressure for 20 seconds without further pumping. That is a typical test, but the test requirements can be quite different, even as high as 25,000 psi. This depends typically on the circumstances in which the joint is to be used.

In testing, the joint is rolled to the location where it rests on the V-shaped supports 30. The pin test head is first engaged and expanded. Filling can start from that end immediately upon expansion clamping. The box test head is also centered in the pipe end but is left relaxed during the filling sequence. Filling continues as air bubbles are driven out through the small gap at that end or otherwise vented. In this preferred operative sequence, air bubbles are forced out through the gap and when water begins to flow in volume, it is an indication that the box test head can be set by applying hydraulic pressure to swell the resilient plug 54 and complete sealing. The pump is operated until the pressure level required is achieved. It is held steady for an interval to see whether or not leaks have occurred. When the test is over, pump pressure is dropped, and both test heads are relaxed to provide disengagement of the expanded resilient plugs and water is quickly drained out of the sloping tubular member.

Operation of the joint testing apparatus shown in the drawings involves movement of the test heads toward and away from the joint. This is accomplished by rolling the carriage 20 to a specified location and locking it in position. This is used to close the gap between the carriage 20 and the joint. The hydraulic cylinder 24 is operated to extend the remaining distance. It moves to the position shown in FIG. 5. While this is occurring at one end of the joint, the opposite end is handled in the same fashion. Accordingly, the carriages are reciprocated back and forth as joint after joint is rolled into the test position, then tested and then removed. This high speed sequencing of multiple joints for testing is enabled by the arrangement of the equipment so that different personnel operating at the two ends of the equipment can move the carriages independently of one another. Moreover, they can be visually inspected as they center the respective test heads to the joint to assure proper seating without overrunning the joint with the test heads.

By means of the pump 32, the joint is filled in the ordinary fashion, pressure is held at a specified level while the heads are sealed to prevent escaping water, and the pressure is monitored until the requisite interval and minimum pressure for a duration. Typically, a strip chart recorder that records pressure as a function of time is utilized to form a written record showing the passage of time, the actual pressure achieved over the test, and marginal notations can be made on the strip chart identifying the particular joint by some type of serial number.

Consider the possibility that the joint is destructed by testing. In that rare event, a seam may split, a weld part or some other kind of failure might occur. Should the failure be sufficiently severe that the joint would break into portions, the portions are not free to travel upwardly or downwardly because they are confined within the stringers 16 and the various frame members 18. Broken portions are not totally free to fly out the side of the apparatus shown in FIG. 2 because the joint racks on the left and right block clearance. Accordingly, catastrophic failure of the joint is confined. This is highly desirable to avoid injury to nearby personnel because it is not uncommon for catastrophic failure to blow a substantial portion of the joint up into the air, possibly killing nearby personnel. Moreover, the present apparatus utilizes the carriages at the ends of the joint to block joint failure where pipe projected. This equipment, therefore, substantially confines the joint and yet still permits easy access for transfer after testing.

While the foregoing is directed to the preferred embodiment, the scope thereof is determined by the claims which follow.

What is claimed is:
1. A joint testing apparatus comprising:
 (a) joint hydrostatic pressure testing means sealing at the two ends of a joint to be tested wherein the joint is filled with an incompressible liquid for pressure testing;
 (b) an elongate frame for supporting said joint testing means and the joint being tested thereon;
 (c) means for dividing said frame into relatively movable portions wherein the portions are joined to form the full length of the frame and are selectively moved for assembly in a shorter structure;
 (d) wheels for supporting said shorter structure to enable said structure to be rolled over a surface; and
 (e) means for connecting said shorter structure to a towing vehicle wherein the vehicle pulls said structure on said wheels, and wherein said frame has a pipe joint length side loading slot therein for receiving a joint to be tested.

2. The apparatus of claim 1 including multiple elongate stringers extending the length of said structure, and wherein said dividing means includes hinges in said stringers for folding said stringers, and also including latch means to connect said stringers.

3. The apparatus of claim 2 including a removable leveling jack placed under one end of said frame to obtain a specified angle for testing.

4. The apparatus of claim 1 including end located carriages for said pipe testing means.

5. The apparatus of claim 4 wherein said carriages are movable along said frame toward a pipe to be tested, and said pipe is engaged by first and second carriage mounted test heads.

6. The apparatus of claim 5 wherein said test heads move toward the pipe undergoing tests and are moved by test head extending means to initially register said test heads relative to the ends of the pipe, and further including means for fastening said carriages at fixed locations on said frame for testing.

7. The apparatus of claim 1 wherein said frame includes at least four elongate lengthwise stringers arranged in a rectangular pattern, and wherein said stringers are hinged at a central portion to permit folding to form said movable portions, and wherein said movable portions are equal in length.

8. The apparatus of claim 1 wherein said pipe testing means includes
 (a) pin end test head means;
 (b) box end test head means;
 (c) means relatively moving said pin and box end test head means into end sealing relationship with a pipe joint to enable sealed hydrostatic pressure testing of the pipe joint; and
 (d) pump means for delivery of water into the pipe joint for testing.

9. The apparatus of claim 8 wherein said side loading slot is between a pair of spaced horizontal frame members and is longer than an industry standard pipe joint length.

10. A joint testing system for hydrostatic pressure testing of a joint of pipe, the system comprising:
 (a) an elongate structure for supporting a joint of pipe to be tested thereon;
 (b) first and second end located carriage means on said structure wherein said carriage means respectively support first and second test heads for the joint;
 (c) first and second resiliently expandable joint gripping plugs wherein said first plug has a joint engaging outer surface for contact against the pin end of a joint, and said second plug has a joint engaging inner surface for contact against the box end of a joint; and
 (d) wherein said resilient plugs are radially expanded to joint gripping and sealing to capture liquid in the joint undergoing tests at a specified minimal pressure and further wherein said joint gripping plugs are contacted against the joint and the joint is not otherwise constrained by said test heads.

11. The apparatus of claim 10 wherein said first and second resilient pipe gripping plugs both are positioned between spaced, joint end located rigid first and second members, and including means moving said first and second members to compress said resilient pipe gripping plugs and cause radial expansion on compression thereof.

12. The apparatus of claim 10 wherein said first plug is sized to fit within the pin end of the joint, and the outer surface thereof expands radially outwardly to plug and seal the joint at the pin end.

13. The apparatus of claim 10 wherein said second plug is sized to fit around the box end of the joint, and the inner surface thereof expands radially inwardly to plug and seal the joint at the box end in cooperation with a transverse plate covering the end of the joint.

14. The apparatus of claim 13 including a fixed surrounding cylinder about said second plug, said cylinder connecting to said transverse plate, said plug fitting fully therein.

15. The apparatus of claim 14 including a water flow line into the box end of the joint wherein said line passes through said plate.

16. The apparatus of claim 15 wherein said plate and cylinder confine said second plug permitting only radial inward expansion thereof.

17. A joint testing system for hydrostatic pressure testing of a joint of pipe, the system comprising:

(a) an elongate structure for supporting a joint of pipe to be tested thereon;
(b) first and second end located carriage means on said structure wherein said carriage means respectively support first and second test heads for the joint;
(c) first and second resiliently expandable joint gripping plugs wherein said first plug has a joint engaging outer surface for contact against the pin end of a joint, and said second plug has a joint engaging inner surface for contact against the box end of a joint; and
(d) wherein said resilient plugs are radially expanded to pipe gripping and sealing to capture liquid in the joint undergoing tests at a specified minimal pressure and further wherein said joint gripping plugs are contacted against the joint and the joint is supported during test by contact with said first and second resilient plugs.

18. The apparatus of claim 17 wherein said first plug is sized to fit within the pin end of the joint, and the outer surface thereof expands radially outwardly to plug and seal the joint at the pin end.

19. The apparatus of claim 17 wherein said second plug is sized to fit around the box end of the joint, and the inner surface thereof expands radially inwardly to plug and seal the joint to the box end in cooperation with a transverse plate covering the end of the joint.

20. The apparatus of claim 19 including a fixed surrounding cylinder about said second plug, said cylinder connecting to said transverse place, said plug fitting fully therein.

* * * * *